United States Patent
Folcio et al.

(10) Patent No.: US 10,563,097 B2
(45) Date of Patent: Feb. 18, 2020

(54) COMPOSITE SYSTEM COMPRISING A MATRIX AND SCATTERING ELEMENTS, PROCESS FOR PREPARING IT AND USE THEREOF

(71) Applicant: COELUX S.R.L., Lomazzo (CO) (IT)

(72) Inventors: Franco Folcio, Canzo (IT); Antonio Bernardo Di Gregorio, Rovagnate (IT); Paolo Di Trapani, Cavallasca (IT)

(73) Assignee: CoeLux S.r.l., Lomazzo (IT)

( * ) Notice: Subject to any disclaimer, the term of this patent is extended or adjusted under 35 U.S.C. 154(b) by 43 days.

(21) Appl. No.: 15/558,672

(22) PCT Filed: Mar. 18, 2016

(86) PCT No.: PCT/EP2016/056001
§ 371 (c)(1),
(2) Date: Sep. 15, 2017

(87) PCT Pub. No.: WO2016/146825
PCT Pub. Date: Sep. 22, 2016

(65) Prior Publication Data
US 2018/0112111 A1    Apr. 26, 2018

(30) Foreign Application Priority Data
Mar. 18, 2015   (EP) ..................................... 15159738

(51) Int. Cl.
| | | |
|---|---|---|
| *C09J 11/04* | (2006.01) | |
| *C08K 9/06* | (2006.01) | |
| *B32B 17/10* | (2006.01) | |
| *C03C 27/10* | (2006.01) | |
| *C09D 7/62* | (2018.01) | |
| *C09D 7/40* | (2018.01) | |
| *C08K 3/22* | (2006.01) | |
| *C09C 1/04* | (2006.01) | |
| *C09D 5/33* | (2006.01) | |
| *C09D 129/14* | (2006.01) | |
| *C09D 131/04* | (2006.01) | |
| *C09J 9/00* | (2006.01) | |
| *C09J 129/10* | (2006.01) | |
| *C09J 131/04* | (2006.01) | |
| *G02B 1/14* | (2015.01) | |
| *G02B 5/02* | (2006.01) | |

(52) U.S. Cl.
CPC ......... *C09J 11/04* (2013.01); *B32B 17/10623* (2013.01); *B32B 17/10761* (2013.01); *B32B 17/10788* (2013.01); *C03C 27/10* (2013.01); *C08K 3/22* (2013.01); *C08K 9/06* (2013.01); *C09C 1/04* (2013.01); *C09D 5/004* (2013.01); *C09D 7/62* (2018.01); *C09D 7/67* (2018.01); *C09D 7/68* (2018.01); *C09D 129/14* (2013.01); *C09D 131/04* (2013.01); *C09J 9/00* (2013.01); *C09J 129/10* (2013.01); *C09J 131/04* (2013.01); *B32B 2307/41* (2013.01); *C01P 2004/62* (2013.01); *C01P 2004/64* (2013.01); *C08K 2003/2241* (2013.01); *C08K 2003/2296* (2013.01); *C08K 2201/005* (2013.01); *C08K 2201/011* (2013.01); *G02B 1/14* (2015.01); *G02B 5/0242* (2013.01)

(58) Field of Classification Search
CPC .............................. C09J 131/04; C09J 129/14
See application file for complete search history.

(56) References Cited

U.S. PATENT DOCUMENTS

| 7,033,524 B2 | 4/2006 | Kumacheva |
|---|---|---|
| 8,068,285 B1 | 11/2011 | Flynn |
| 2007/0160826 A1 | 7/2007 | Wang et al. |
| 2010/0189970 A1 | 7/2010 | Pokorny et al. |
| 2016/0363777 A1 | 12/2016 | Flynn et al. |
| 2017/0074486 A1 | 3/2017 | Flynn et al. |

FOREIGN PATENT DOCUMENTS

| GB | 2450192 C | 12/2008 |
|---|---|---|
| JP | 2000281934 | * 10/2000 |
| JP | 2002274860 A | 9/2002 |
| WO | 2009156348 A1 | 12/2009 |

OTHER PUBLICATIONS

JP 2000 281934 machine translation (2000).*
Standard Terminology of Appearance, ASTM International, Designation: E284-09a, downloaded Feb. 2012, pp. 1-23, 23 total pages.
Kerstin Götz, European International Searching Authority, International Search Report and Written Opinion, counterpart PCT Application No. PCT/EP2016/056001, dated May 25, 2016, 13 pages total.
Database WPI, Week 200107, Thomson Scientific, London, GB; AN 2001-053653, XP002743433, & JP 2000 281934 A (Nippon Shokubai Co Ltd), Oct. 10, 2000, abstract, 2 pages total.
Database WPI, Week 200308, Thomson Scientific, London, GB; AN 2003-079507, XP002743434, & JP 2002 274860 A (Olympus Optical Co Ltd), Sep. 25, 2002, abstract, 1 page total.
Patrick Masson, European Searching Authority, European Search Report, counterpart European Application No. 15159738.2, dated Aug. 18, 2015, 2 pages total.

* cited by examiner

*Primary Examiner* — Kuo Liang Peng
(74) *Attorney, Agent, or Firm* — DiBerardino McGovern IP Group LLC

(57) ABSTRACT

A composite system for light diffusion comprises a matrix of a material that is transparent to light; the matrix contains a dispersion of scattering elements having a core that is a nanocluster of inorganic nanoparticles, and a shell comprising silane compounds and dispersing agents; the nanocluster having average dimensions in the range of 20 nm to 300 nm.

30 Claims, No Drawings

COMPOSITE SYSTEM COMPRISING A MATRIX AND SCATTERING ELEMENTS, PROCESS FOR PREPARING IT AND USE THEREOF

BACKGROUND OF THE INVENTION

The present invention relates to a composite system comprising a matrix and scattering elements, to a process for preparing said system and to uses of said system. In particular, the composite system of the present invention comprises a matrix that includes a uniform and random dispersion of scattering elements, the scattering elements comprise an inorganic core and a shell. In an exemplary embodiment, the matrix is a polymer matrix.

DESCRIPTION OF THE PRIOR ART

Nanoparticles or particles dispersions (for simplicity, all of them are referred to here as nanoparticles) can be used as fillers, generally functional fillers, in polymer matrices to produce polymer matrix/nanoparticle composites (PMNCs) with particular properties.

The surface of inorganic nanoparticles usually is treated in order to increase their compatibility with the matrix in which they have to be dispersed. In the literature various surface modification techniques are discussed. Common organic capping agents are, e.g., thiols with long alkyl chains, or silane-based compounds.

Examples of application of PMNCs are e.g.:

WO 2009/156348 discloses a light diffuser obtained from a transparent polymer matrix that includes a dispersion of inorganic nanoparticles; WO 2009/156348 discloses to suspend surface treated clusters of nanoparticles in liquid matrix-forming monomer(s). The suspended clusters are treated in order to break up the cluster and to obtain a dispersion of "primary particles", i.e. a dispersion of single nanoparticles.

In other words, the inorganic nanoparticles are functionalized to make them hydrophobic and compatible with the selected matrix, and then they are dispersed until a dispersion of single nanoparticles is obtained. By this method, the application aims at maintaining the nanoparticles in a non-aggregate condition.

U.S. Pat. No. 7,033,524, relates to composites obtained from core-shell nanoparticles that optionally are void to incorporate further materials; in particular polypyrrole particles are provided with a shell and annealed to provide a conductive film.

The PMNCs have potential applications in various fields such as in optics, optoelectronics, magneto-optics, mechanical enhancement, paints etc. For most of these applications, the major and critical requirement is that the nanoparticles have to be uniformly and randomly distributed within the matrix. This has been shown in literature to be extremely difficult to perform, not only in large commercial scale productions but also in lab-scale experiments, because nanoparticles always tend to aggregate during their integration into polymer matrices.

Another problem of the known PMNCs is the selection of the polymer for the shell, that has to be selected in order to obtain a satisfactory compatibility between the nanoparticles and the matrix into which they are dispersed to give the final product.

Additionally, deviation from the optimum dimension range of the dispersed nanoparticles, when used for light scattering, can affect the scattering of the light, thus compromising the final effect. This is especially true when the particles aggregate to form clusters in the polymer matrix.

Therefore, the selection and the control of the dimension of the nanoparticles to be dispersed is another problem of the known PMNCs. In fact, as discussed above, the known approaches for preparing a dispersion of particles, useful for light scattering purposes, are focused on using single nanoparticles, and on how to avoid the formation of clusters, that may negatively affect the scattering.

In view of these technical requirements, the methods of production presently known are expensive to carry out and not suitable for industrial production.

A further problem of the known diffusers is their low resistance to scratch and abrasion.

SUMMARY OF THE INVENTION

It is an aim of the present invention to solve the above problems and to provide a method for preparing a nanocomposite system in which a matrix has a uniform and random distribution of scattering elements.

In particular, it is an aim of the present invention to provide a method that overcomes the above discussed technical difficulties, and which can be effectively applied in industrial production.

The wording "scattering elements" will be used to define a nanocluster of nanoparticles having a shell, suitable to provide light scattering.

As used herein, the term "nanoparticles" defines inorganic particles having an average dimension in the range of 10 to 150 nm.

As used herein, the term "nanocluster" defines an aggregate of nanoparticles as above defined; in an exemplary embodiment of the invention, the average dimension of the nanoclusters is in the range of 20 to 300 nanometers, preferably 50 to 200 nanometers, more preferably 80 to 130 nanometers. Nanoclusters within these dimension ranges will provide the required light scattering effect. Because the dimensions of the nanoparticles is in the range of 10 to 150 nm and the dimension of the nanocluster is 20 to 300 nm, the dispersion of nanoparticles may include, in addition to the nanoclusters of nanoparticles, also a number of single nanoparticles provided with a shell including a silane compound and a dispersing agent. In other words, the present invention does not exclude the presence of silanized single nanoparticles in the final product and in the mixture of silanized nanoclusters. With the wording "uniform distribution" it is meant that scattering elements are homogeneously distributed within a matrix, i.e. with an average density which is virtually constant across the system, wherein said average density is measured over volumes larger than 0.1 mm$^3$, namely over volumes of 1 mm$^3$.

It is a further aim of the invention to have a random distribution of the scattering elements; with the wording "random distribution" it is meant that once the scattering element are dispersed into a matrix, they substantially do not further aggregate into elements with dimension over the range according to the present invention.

In other terms, one of the aims of the invention is to guarantee both a minimum distance between the scattering elements surface and, distance between neighbouring scattering elements follows a random distribution above a minimum value that results in the required scattering effect.

With the wording "uniform and random distribution" it is meant a combination of the above definitions, whereby scattering elements are distributed within a matrix in a statistically disordered manner, and without any correlation in their respective position.

It is a further aim of the invention to provide a matrix/nanocluster composite material, preferably a polymer matrix/nanocluster composite material, that is suitable to be used for the production of a light diffuser that can chromatically separate white visible light into at least two chromatic components: one in which the blue component is dominant and one in which the blue component is low. The diffuser of the present invention should be able to perform the same function of the diffuser disclosed in the above mentioned application WO 2009/156348.

These aims are reached by the present invention, that provides a composite system according to claim 1.

The invention also relates to a process for preparing a composite system, according to claim 13.

Preferred embodiments are object of the dependent claims.

In a preferred embodiment, the scattering elements of the invention are not provided with a first, cross-linked, polymer shell and with a second polymer shell that is not cross-linked; wherein the second shell is made of the same polymer of the matrix for the final product, or of a polymer compatible and dispersible in said matrix polymer.

In another exemplary embodiment, nanoparticles of inorganic material, used to prepare nanoclusters, are hydrophobically modified, to make them compatible with organic solvents. According to an exemplary embodiment of the invention, the nanoclusters, made of modified nanoparticles, are first treated with at least a dispersing agent, and later treated with at least a silane compound.

In a preferred embodiment of the invention, the scattering elements are dispersed in an adhesive material of the type used for glass lamination (e.g. EVA or PVB) to provide a composite system containing the scattering elements as above defined and said adhesive material as the polymer matrix. The composite system in this embodiment of the invention preferably is in the form of a film and, when used to bind together (i.e. laminate) layers of glass, the film system is processed in the same way as the known films in glass lamination processes. In other words, the film system of adhesive material and nanoclusters can be used in known processes of glass coupling, i.e. in processes of glass lamination to provide a laminated glass having the scattering properties according to the present invention.

It was surprisingly found that the scattering elements of the invention can be dispersed in the above cited adhesive materials for glass lamination to provide a composite system in the form of a film that has the scattering characteristics of the present invention.

Further objects of the invention are therefore a laminated glass containing a film, the film having the features according to claim 11 and a process for laminating glass according to claim 19, wherein a film of adhesive, i.e. coupling, material according to claim 11 or 12 is used to bind, i.e. couple, together glass layers.

DETAILED DESCRIPTION OF THE INVENTION

According to the present invention, the composite system illustrated in the present specification, comprises a matrix, preferably a polymer matrix, wherein a plurality of scattering elements, as defined above, is dispersed; the material, preferably a polymer material, used for preparing the matrix is a material that per se is transparent and does not absorb light, i.e. the matrix without scattering elements is transparent and does not absorb light.

In the following description, reference will be made to a polymer matrix, however this reference is not intended to limit the scope of the application to polymer matrices only; other matrices, e.g. of inorganic materials, may be used. The scattering elements comprise a core and a shell. The core of the scattering elements is made of nanocluster, i.e. an aggregate of nanoparticles of a material that is different from the matrix, e.g. a polymer matrix, and has a refractive index that is different from the refractive index of the matrix to provide a scattering of at least a portion of the light transmitted through said system or a product containing said system. Preferably, the core is made of nanoparticles of one or more materials that do not absorb light. However, in certain embodiments the possibility of using cores made of materials which absorb light is admitted.

The core of a scattering element according to the present invention is made of a cluster of inorganic nanoparticles. In a preferred embodiment, the core of a scattering element according to the present invention is made of at least one inorganic material, i.e. a nanocluster made of nanoparticles of at least one inorganic material, said inorganic material being preferably selected from metal oxides, more preferably selected from $TiO_2$, $SiO_2$, ZnO, $ZrO_2$, $Fe_2O_3$, $Al_2O_3$, $Sb_2SnO_5$, $Bi_2O_3$, $CeO_2$, or a combination of thereof. Preferred oxides are $TiO_2$ and ZnO.

The matrix/nanocluster, preferably polymer matrix/nanocluster, composite system above disclosed preferably provides a Rayleigh scattering or a Rayleigh-like scattering of at least a portion of the transmitted light.

In the present application a "composite system" is used to define (and protect) both the final product, e.g. a matrix/nanocluster composite system, preferably a polymer matrix/nanocluster composite system, and the separate starting materials, i.e. the material, preferably a polymer, for the matrix, and the scattering elements to be dispersed therein.

The material used for preparing the matrix, preferably a polymer, is not absorbing and transparent, i.e. the final matrix, without scattering elements, is made of a material in which the transmission of light is essentially regular and which has a high transmittance in the visible region of the spectrum.

The matrix can have any shape and can be made of any material that can be used for the purpose and that has the above mentioned properties of being transparent and not light absorbing. Exemplary embodiments of a matrix are a panel, e.g. in PMMA or other polymer, a film and a paint, namely the layer that remains on the substrate after the paint has been applied and the solvent has evaporated.

The dimensions of the scattering elements are small enough to provide a Rayleigh scattering of the type discussed and disclosed e.g. in WO 2009/156348; exemplary average dimensions of the inorganic nanoparticles used in the invention are in the range of 10 to 150 nm, preferably 30 to 50 nm. As mentioned above, the nanoparticles are used as aggregates, i.e. nanoclusters; the average dimensions of the nanoclusters is in the range of 20 to 300 nanometers, preferably 50 to 200 nanometers, more preferably 80 to 130 nanometers. Nanoclusters within these dimensions will provide the required light scattering effect. As previously mentioned, the dispersion of nanoparticles may include, in addition to the nanoclusters of nanoparticles, also single nanoparticles provided with a shell including a silane compound and a dispersing agent. In other words, the present invention does not exclude the presence of silanized single nanoparticles in the final product and in the mixture of silanized nanoclusters, provided the dimensions of the single nanoparticles are within the range of 20 to 300 nanometers.

Several inorganic nanoparticles suitable to obtain a scattering element according to the present invention are available on the market; in particular, nanoparticles of $TiO_2$ and ZnO are commercially available in the required average dimensions 10-150 nm. Preferred nanoparticles are commercially available nanoparticles with dimensions in the range of 10 to 150 nm, most preferably 30 to 50 nm.

According to a preferred embodiment, nanoparticles according to the present invention are bought from professional producers, in a pre-treated of pre-functionalized form, according to manufacturer's practice, as previously disclosed with reference to the prior art. The surface of inorganic nanoparticles usually is treated (by so-called "capping") in order to increase their compatibility with the matrix in which they have to be dispersed. Common organic capping agents are thiols with long alkyl chains, or silane-based compounds such as alkylalkoxysilanes namely methyltrimethoxy, isobutyltriethoxy, octyltriethoxy, octyldimethylmethoxy and octadecyltrimethoxysilane.

A description of suitable capping agents is provided e.g. by WO2009/156348, above mentioned. A scattering element according to the present invention may have an average dimension in the range of 20 nm to 300 nm. The shell made by the silane-based molecules around the nanocluster core has reduced dimensions, in the order of a few nanometers, so that the dimension of a scattering element is comparable to the dimension of a nanocluster core. For example, when a scattering element of 120 nm is desired, the core of said scattering element may be formed by 4 inorganic nanoparticles having, for example, average dimension of 30 nm each one, i.e. a nanocluster consisting of 4 inorganic nanoparticles.

The inorganic core of the scattering elements of the present invention can comprise one or more inorganic materials, e.g. a mix of $TiO_2$ and ZnO nanoparticles.

The composite system is said to be a Rayleigh-like diffuser if said system or at least a portion of it produces a haze, as defined in the ASTM Designation E284-09a, which is at least 1.5 times larger, preferentially 2 times, more preferentially 3 times, for an impinging light in the spectral interval 400-450 nm than in the interval 600-650 nm, said property being verified for at least one direction of the impinging light beam with respect to the composite system, and wherein by a portion of composite system it is meant, for example, a thin slice if the system is shaped as a bulk solid material or a thin layer if the system is for example a liquid coating or paint.

In fact, in the case of thick samples, for example a large tin of paint, multiple scattering can hinder the property of preferentially scattering the short wavelength component of the impinging light with respect to the longer one.

Notably the Rayleigh like scattering property appears when a sufficiently thin layer of material is used, where multiple scattering does not occur. In the present description, unless differently and specifically defined, the meaning of terms and words is to be referred to ASTM E284-09a and to the following standards (as long as they are not in contrast with ASTM E2884-09a): ASTM D1746-09; ASTM D 1003-07; ISO 13468-2:1999(E).

In a preferred embodiment, the core of the scattering element is made of at least one inorganic material. The core's inorganic material has a refractive index that is different from the refractive index of the matrix, e.g. a polymer matrix, said matrix being made of transparent materials that do not absorb light.

The scattering element according to the invention also comprises a plurality of silane-based compounds, e.g. silane coupling agents. The silane-based molecules are bound to the inorganic core to form, at least in part, a shell. Preferably, they have a free end that comprises a functional group. The functional group is preferably selected in view of the nature of the matrix in which the scattering elements have to be dispersed. The functional group provides good affinity and compatibility of the scattering elements to the matrix, especially to the polymer matrix, without the need of preparing a polymer shell of the material used for the polymer matrix.

Therefore, a scattering element, according to a preferred embodiment of the invention, comprises a core comprising a nanocluster of inorganic nanoparticles, provided with a plurality of silane compounds.

It was surprisingly found that providing the inorganic core of the scattering element, i.e. a nanocluster of inorganic nanoparticles, with at least one silane-based compound, allows the control of the dimension of the scattering elements. In greater detail, it was found that it is possible to disperse commercial inorganic nanoparticles, such as $TiO_2$ and ZnO, in a solvent in the presence of at least a dispersing agent, until the required dimensions are reached and that the dispersed nanoparticles and nanoclusters are "frozen" in the correct dimensions by treating them with at least a silane-based compound, namely silane coupling agents.

It is assumed that the silanes will form, at least in part, a shell around the inorganic core of the scattering elements; this shell is different from the shells of the prior art in that it does not comprise a polymeric structure and has a reduced thickness compared to the prior art core-shell particles. The shell in the present invention is preferably free from monomers and/or polymers that are the same material as that used for the polymer matrix (when a polymer matrix is used).

Suitable silane compounds for binding to a nanocluster of a scattering element according to the invention are, for example:

Triacetoxy(methyl)silane, Di-Tert-butoxydiacet-oxysilane, Phenyltriethoxysilane, (3-Aminopropyl)tris(trimethylsiloxy)silane, N-(n-butyl)-3-amino-propyltrimehoxysilane, N-[3-(Trimethoxysilyl)propyl]aniline, Bis(3-triethoxysilylpropyl) amine, γ-Aminopropyltriethoxysilane, 2-(Allyldimethylsilyl)pyridine, 3-(Trimethoxysilyl)propyl-methacrylate, Viniltrimethoxysilane, Triphenyl(vinyl)silane, Tris(2-methoxyethoxy)(vinyl)silane, γ-Glycidoxypropyltrimethoxysilane, 3-(Triethoxysilyl)propyl isocyanate, or a mixture thereof.

Because the scattering element is obtained by silanization (i.e. treatment with silane compounds as above defined) of an inorganic nanocluster dispersed in a solvent by means of dispersing agents, the shell usually comprises an amount of residual dispersing agents.

Suitable dispersing agents are, for example, ANTI-TERRA-204, ANTI-TERRA-U, BYK-306, BYK-320, BYK-333, BYK-378, DISPERBYK-108, DISPERBYK-142, DISPERBYK-180, DISPERBYK-2022, BYK-310, BYK-378, BYK-399, BYK-3550, BYK-7410 ET, BYK-D 410, DISPERBYK-111, DISPERBYK-2055, DISPERBYK-2152, DISPERBYK-2155, DISPERBYK-2164, GARAMITE-1958, BYK-349, BYK-3455, BYK-7420 ES, BYK-D 420, DISPERBYK-2010, DISPERBYK-2012, BYK-3455, BYK-D 420, DISPERBYK-194 N, ANTI TERRA-250, DISPERBYK-194 N, DISPERBYK-2015, DEUTERON ND 953, DEUTERON ND 210, BOUR-WET C11, BOUR-WET 80, BOUR-WET WS MP, BOUR-WET WS 548, IDROFIL BPT 500, RESOLUTE III, IDROPON LOGIC 30, IDROPON LOGIC 40.

A monomer, for example:

1,6-hexanediol diacrylate, 2-(2-ethoxyethoxy)ethyl acrylate, Lauryl Acrylate, C12/C14 acrylate, C16/C18 acrylate, C18/C22 alkyl acrylate, 2-phenoxyethyl acrylate, Octyl decyl acrylate, Isodecylacrylate, Ethoxylated 4 phenyl acrylate, 3,3,5-trimethyl cyclohexanol acrylate, Methyl methacrylate, Iso octil acrylate, Iso bornyl acrylate, Ethoxylated (5) hexanediol diacrylate, Tridecyl acrylate, N-Vinyl-pyrrolidone, N-vinyl-caprolactam, Ethyl Vinyl ether, n-butyl vinyl ether, iso-butyl vinyl ether, tert-butyl vinyl ether, dodecyl vinyl ether, 1,4Butanediol divinyl ether, Hydroxybutyl vinyl ether, 3-Vinylaniline, 4-Vinylaniline, 4-Vinylanisole, 4-Vinylbezoic Acid, 4-Vynilbenzyl chloride, 4-Vinylbiphenyl, Ethenylbenzene, can also be used as dispersing medium.

In a preferred embodiment, materials suitable for the matrix are resins (polymers) having excellent optical transparency selected from thermoplastic, thermosetting and photocurable resins. Preferred resins are in particular acrylic resins (e.g. PMMA), epoxy resins, polyester resins such as polyethylene or polybutylene terephtalates and polycaprolactone; polystyrene resins (e.g. Polystyrene); PTFE and similar fluorinated resins and fluorene resins; polyamide resins (e.g. nylon); polyimide resin; polycarbonate; polysulfone; polyphenylene ethers; polyvinylalcohol resins; vinyl acetate resins; polyether sulfone; amorphous polyolefins; polyarilate; liquid crystal polymers.

When a non-polymeric matrix is preferred, e.g. an inorganic matrix, suitable materials for the purpose of the invention are those that include, but not limited to: soda-lime-silica glass, borosilicate glass, fused silica, etc.

In a certain embodiment, the composite system is made as a rigid and self-sustaining panel, i.e. a panel which substantially does not bend when suspended horizontally from any two sides. For example, a said composite system might be shaped as a parallelepiped featuring a thickness in the rage 0.5-5% of its length, wherein thickness and length are here defined as the smallest and largest side of the panel, respectively. A typical length of said rigid panel is in the range 0,5-3 m. When a polymer matrix is used, a preferred molecular weight for the linear polymer of the matrix is in the range of 450.000 to 2.000.000 g/mol.

In a further embodiment, the composite system is made as a foil, here defined as a rigid but not self-sustaining panel, i.e., a panel which, in analogy with the rigid panel, is not flexible (i.e. it breaks when it is bended along short-curvature angles, e.g. when it is bended by 180°) but which does not keep its shape when suspended horizontally. For examples, foil composite systems might have thickness smaller than 0,005 times the length. In analogy with the rigid panel case, foils might feature a matrix made of a polymer of high molecular weight.

According to still another embodiment of the invention, the composite system is made as flexible film, here defined as non-rigid sheet, i.e. a sheet which does not break when it is bended along short-curvature angles, e.g. when it is bended by 180°. For example, a flexible-film composite-system might have thickness in the range from 10 micron to 1 mm, preferentially from 50 micron to 0,5 mm. In addition, it might comprise a plastifier and/or a polymeric shock absorber and/or a co-polymer made from a plurality of different monomers tailored in order to achieve the desired flexibility.

In a preferred embodiment, the composite system is configured as a sky-sun diffuser i.e. a diffuser capable of separating an impinging white light into a bluish diffused and a yellowish transmitted component, as the sky does with the white impinging sunlight. More generally, said composite system might contain a number of scattering elements per unit area which suffices to guarantee that at least a few % (e.g. 5%) of an impinging white light is scattered by the system in Rayleigh-like regime. For example, the composite system might be shaped as a rigid panel, or a foil or a flexible film and, independently from the thickness, it might feature a scattering element areal density, namely the number N of scattering elements per square meter, i.e.

the number of scattering elements within a volume element delimited by a portion of the panel, foil or film surface having an area of 1 $m^2$, wherein N satisfies the condition $N \geq N_{min}$, e.g. $2N_{min} \leq N \leq 13N_{min}$, preferably N is in the range $3N_{min}$ to $10N_{min}$, most preferably $N \approx 6N_{min}$ and wherein:

$$N_{min} = \upsilon \frac{10^{-29}}{D^6} \cdot \left| \frac{m^2+2}{m^2-1} \right|^2$$

wherein $\upsilon$ is a dimensional constant equal to 1 $meter^6$, $N_{min}$ is expressed as a number/$meter^2$, the effective diameter D, which is given by the scattering element diameter times the matrix refractive index, is expressed in meters and wherein m is equal to the ratio of the refractive index of the scattering elements core to the refractive index of the matrix material.

In another, different, embodiment, the composite system is made as a paint, i.e. as a dispersion of resins and additives in a solvent, e.g. in an organic or aqueous solvent. In the typical case, the paint composite system features a scattering elements concentration (i.e. a number of scattering elements per unit volume) such to guarantee that the condition $N \geq N_{min}$, e.g. $2N_{min} \leq N \leq 13N_{min}$, preferably $3N_{min} \leq N \leq 10N_{min}$, most preferentially $N \approx 6N_{min}$, is fulfilled for a paint layer that after drying has a thickness in the range 1-50 microns.

Typical embedding matrix for said systems are polymers such as PET, PVC, EVA and similar, for the case of films, and polymers such as acrylics, vinylics, polyurethane and similar for the case of paints.

In some embodiments, and particularly when the system is shaped as a panel, a foil or a film, showing a surface of size much larger than the system thickness, the request for the system of exhibiting a visually uniform Rayleigh like scattering across the surface translates in having an average areal density N, measured over areas larger than of 0,25 $mm^2$, which is substantially constant across the surface. Notably this feature does not necessarily require the scattering elements volume density to be constant across the sample since any fluctuation or variation of the scattering elements volume density in the direction perpendicular to the surface is not perceived, since the observer only perceives the integrated effect.

In a further embodiment, the composite system is made as a complex-shape elongated object, i.e. an object whose shape differs from the parallelepiped and is such that the smallest circumscribed ellipsoid has a flattening f>0.5, where f=(a−b)/a, wherein a is the semi-major axis and b is the semi-minor axis; said elongation is suitable in order to allow different portions of the same object to scatter light with different colours, as the sky does during sunset or sunrise, etc.

In a different embodiment a "sandwiched" sky-sun diffuser might comprise two glass external layers and an central layer shaped as a film comprising a dispersion of scattering elements in a polymer matrix in order to obtain a new glass panel or window which behaves both as a safety glass for what concerns the mechanical properties and as a Rayleigh like diffuser for what concerns the optical properties. In addition, said sandwiched sky-sun diffuser might also comprise two layers of adhesive materials which might optically and/or mechanically match the composite system internal layer with the external layers, i.e. prevent multiple reflections and provide the elasticity required to compensate for different thermal expansion of internal and external layers. Suitable adhesive materials are known in the art; e.g. possible materials are EVA (ethylene vinyl acetate), Ionoplast (ethylene/methacrylic acid copolymers containing small amounts of metal salts) such as DuPont™ SentryGlas® Plus, and PVB (Polyvinyl butyral). The adhesive materials suitable for this embodiment are provided in the form of films of material that are normally used to laminate together two or more layers of glass to provide a laminated glass. In known processes, the film is placed between two glass layers (i.e. plates) and thermally treated to bind together the glass layers.

It was surprisingly found that the scattering elements of the invention can be dispersed in the above cited adhesive materials to provide a composite system in the form of a film that has the scattering characteristics of the present invention.

In a preferred embodiment of the invention, the scattering elements are dispersed in the adhesive material (e.g. EVA or PVB) to provide a composite system containing the scattering elements as above defined and an adhesive material as the polymer matrix. The composite system in this embodiment of the invention preferably is in the form of a film and, when used to bind together layers of glass, the film system is processed in the same way as the known films. The film system of adhesive material and nanoclusters can be used in known processes of glass coupling, i.e. in processes of glass lamination to provide a laminated glass having the scattering properties according to the present invention.

A different object of the present invention is a painted sky-sun diffuser, i.e. a structure comprising a transparent panel, e.g. glass, polycarbonate, or similar material, coated by the composite-system paint as above discussed.

In a different embodiment said "sandwiched" sky-sun diffuser might comprise, a first layer made of a glass painted sky-sun diffuser, a central layer of an adhesive transparent material, i.e. without scattering elements, in the form of a film, which covers the painted layer and a third glass layer.

Both the sandwiched and the painted sky-sun diffuser provide an important advantage with respect, e.g., to the bare composite-system panel or foil, given by the superior fire retardant properties, which are substantially defined by the characteristics of the external substrate instead of the composite system itself.

In another embodiment, the scattering elements can be dispersed into an anti-scratch paint. In this case, when a transparent substrate, for example PMMA/PC/PPSU (Poly(methyl methacrylate)/polycarbonate/polyphenylsulfone is painted with said anti-scratch paint, a substrate that is both anti-scratch and sky-sun diffusing is obtained.

In a further embodiment, a paint comprising a dispersion of scattering elements according to the invention can be applied onto a surface of a reflecting element, in particular on a glass mirror, or a mirror surface. In this case, the light before and/or after being reflected undergoes a scattering process in a Rayleigh regime as previously discussed.

As mentioned above, the invention also relates to a process for preparing a composite system according to claim 11. Said process comprises steps of providing a dispersion of scattering elements, and dispersing said dispersion into a selected matrix, preferably a polymer, to obtain a composite system according to the invention.

Particularly, the present invention relates to a process for preparing a composite system that is a matrix/nanocluster composite system, preferably a polymer matrix/nanocluster composite system, wherein a plurality of scattering elements is dispersed in a matrix, wherein the material used for preparing the matrix is a material that per se is transparent and does not absorb light, characterized in comprising the following steps:

a) selecting at least one inorganic material made of nanoparticles, said nanoparticles having average dimensions in the range of 10-150 nanometers;

b) mixing said material, at least one solvent and at least one dispersing agent, to obtain a dispersion of nanoclusters having average dimensions in the range of 20 to 300 nanometers;

c) adding at least one silane compound to the dispersion obtained in step b) to give a dispersion of scattering elements having an inorganic core that is a nanocluster as per point b) and at least part of a silane shell;

d) optionally filtering the dispersion obtained in step c) in order to select the dispersed scattering elements having the desired average dimension;

e) dispersing said dispersed scattering elements into the systems from which said matrix will be obtained;

whereby said matrix/nanocluster composite system provides a scattering of at least a portion of the light transmitted through said composite system or through a product containing said system.

In a preferred embodiment, the selected system from which the matrix will be obtained can comprise, e.g. monomers, resins, polymer dispersion etc.

In a preferred embodiment, a process according to the present invention further comprises a step of acidifying the mixture during step b).

In a preferred embodiment, a process according to the present invention further comprises a step of concentrating the dispersion obtained in step d).

According to another preferred embodiment, the inorganic material, i.e. inorganic nanoclusters, is present in a concentration comprised, for example, in the range of 1% to 15% w/w, preferably 5% to 10% by weight, of the dispersion of scattering elements obtained at step c) or d), before said dispersion is added to the matrix.

In further preferred embodiments, the solvent is present, for example, in a concentration in the range of 15% to 95% w/w (by weight) or in the range 80% to 95% w/w of the said dispersion of scattering elements, before addition to the matrix. The actual amount of solvent and of nanoparticles in the dispersion may be selected according to the nature and characteristics of the final matrix, such as the thickness of the matrix; e.g. the percent of nanoparticles in a film is usually higher than the percent of nanoparticles in a—thicker—polymeric panel. An exemplary range for the amount of nanoparticles is 1% to 60%, another exemplary range for the amount of nanoparticles is 1% to 15%. Good results may be obtained with an amount of nanoparticles of about 40% by weight of the said dispersion (i.e. of the dispersion before it is added to the material to provide the final matrix).

Suitable solvents are, for example:

1-butanol, 2-butanol, t-butyl Alcohol, Carbon Tetrachloride, Cyclohexane, 1,2-dichloro ethane, Glycol Butyl Ether, Benzene, Toluene, o-Xilene, m-Xilene, p-Xilene, Propylene Glycol Methyl Ether Acetate, Dimethyl Formamide, Ethoxypropyl Acetate, Dimethyl Sulfoxide, n-Butyl Acetate (CAS: 123-86-84), Ethyl Acetate (141-78-6), Solvesso 150, Solvesso 200, Butyl Cellosolve, 1,3-Dioxane, Ethanol, Heptane, 1-propanol, 2-propanol, pyridine, tetrahydrofuran, diethylene glycol dimethyl ether, diethylene glycol.

In exemplary embodiments, said at least one dispersant is present in a concentration comprised, for example, in the range of 0.,5% to 25.0% w/w. An exemplary range is of 0.5% to 5.0%, preferably of 0.8% to 4.0% by weight, of the dispersion of scattering elements of step b) or c), before adding to the matrix. The amount of dispersant in the final matrix of the composite system of the invention may be as low as 0.01% by weight on the weight of the matrix element. A typical amount is 0.1%. In exemplary embodiments, the amount of silane compound is at least 0.01% by weight on the weight of the matrix element; a typical amount is 0.1%.

In a further preferred embodiment, said at least one silane compound is present, for example, in the range of 0.2% to 13% by weight of the said dispersion; an exemplary range is of 0.2% to 6.0%, preferably of 1% to 4% by weight of the weight of the dispersion of scattering elements of step b) or c), before adding to the matrix. The above mentioned preferred embodiments and the relevant concentration by weight are preferably combined together in a preferred process wherein in said dispersion of scattering elements obtained after step c) or d), the amount of said at least one inorganic material is in the range of 1% to 15% w/w, the amount of said at least one dispersant is in the range of 0.5% to 5.0% w/w and the amount of said at least one silane is in the range of 0.2% to 6% w/w of the dispersion. With the above composition solvent may be in the range of 80% to 95% by weight.

An exemplary composition, by weight, of a dispersion of scattering elements (before being added to the matrix material) is 15%-95% of solvent, 1% to 60% nanoparticles, 0.5% to 25% dispersant and 0.2% to 13% of silane compound.

It has been observed that adding the silane compound to the dispersion, after the nanoparticle material has been dispersed into the mixture of solvent and dispersant, allows to select and control the dimension of the inorganic nanoclusters, and therefore, the dimension of the core of the scattering element according to the invention.

By adding the silane compound, the inorganic nanoclusters, dispersed into the mixture of solvent and dispersant, are prevented to further aggregate; in this way, silane-functionalized nanoclusters of inorganic nanoparticles, which do not further aggregate, are obtained. In other words, the silane "freezes" the cluster of nanoparticles in the size it was in at the time of its addition.

Additionally, a further possible explanation of the effectiveness of the composite system obtained with the present process can be that silanes may adhere and partially replace the dispersing agents on the surface of the inorganic core of the scattering element.

In fact, as stated above, the shell at least partially covering the inorganic nanocluster, i.e. the core of the scattering element, usually comprises, in addition to the silanes, an amount of residual dispersing agents.

Additionally, in the final product can be found traces of the used dispersing agents; possibly, the amount of dispersing agents in the final product may be in the order of a few ppm.

A process according to the present invention, may provide a matrix/nanocluster composite system which is suitable to provide a Rayleigh or a Rayleigh-type scattering of at least a portion of the light transmitted through said system or through a product containing said system.

In a preferred embodiment, a process according to the present invention, is characterized by the fact that said matrix is a paint comprising resins and at least a solvent, and wherein the scattering is provided by said matrix/nanocluster composite system, preferably a polymer matrix/nanocluster composite system, after said solvent of the matrix has evaporated from a layer of paint.

The dispersion of scattering elements can be dispersed in the material, e.g. a monomer, a resin, a polymer dispersion etc., that will form the bulk of the final matrix, and that will be subsequently polymerized in a known way. Alternatively, the obtained scattering elements can be dispersed in a matrix containing polymers, an example of this embodiment of the invention is a paint or an ink that comprises a plurality of scattering elements. In a composite system that is represented by a paint or ink comprising the invention scattering elements, the matrix is formed by the resins, additives and solvents normally present in such products, to which the invention scattering elements have been added. The resulting product is a "preliminary system", i.e. the paint or ink usually does not provide the required scattering when it is in a tin or similar container, but the scattering effect will be provided as soon as a layer of paint or ink has been applied to a transparent substrate. In a preferred embodiment the inorganic nanoparticles are metal oxides as above mentioned, e.g. and preferably $TiO_2$. The $TiO_2$ component, which has a high refractive index, contributes to efficient light scattering.

Another preferred metal oxide is, for example, ZnO.

The present invention provides several advantages over the prior art:

dimensions of the scattering element can be tailored by choosing an appropriate combination of solvents, dispersants and functional agents, i.e. silane compounds.

The choice of the solvent helps in using the same dispersion for the production of bulk object (e.g. panels as described above) and water and solvent based paints.

The type of functional agent allows to couple the scattering elements dispersion with the matrix material of the selected system.

The present invention will be better explained by the following non-limiting example.

EXAMPLE

Phase 1—Selection of the Inorganic Nanoparticles Material

Nanoparticles of Zinc Oxide were used for the development of the core of the scattering element. Zinc Oxide is available on the market and. In this embodiment Zinc Oxide nanoparticles having nominal diameter<100 nm are used. Nanoparticles are present as aggregates. As discussed above, Zinc Oxide is a preferred inorganic material for the core of the scattering elements, since it has a quite high refractive index and leads to efficient Rayleigh scattering effect.

Phase 2—Wetting of the Inorganic Nanoparticles and Acidification of the Working Environment The nanoparticles of phase 1 are added to the solvent. Suitable solvents are the ones mentioned before.

As different solvents can be used, a proper solvent can be selected according to the matrix medium in which the scattering element's dispersion must be incorporated.

At least one dispersant is then added to the solvent and nanoparticles mixture.

Suitable dispersants are the above mentioned ones, marketed, for example, by Byk, Finco, Macri Chemicals and other professional producers.

The resulting mixture is then sonicated (600 W, 22 kHz continuous) at 40-50° C. for 4 days; at the end of this time the average dimension of the nanoclusters is 80-130 nm.

After 1.5 days of sonication, the mixture is acidified by adding Acetic Acid in a quantity of 0.05 ml for 100 ml of solvent, in order to further improve the action of the dispersants.

Phase 3—Functionalization with Silane

The nanoclusters, dispersed as above discussed are functionalized by adding a specific silane compound, selected to obtain the best compatibility with the chemical nature of the final matrix.

The quantity of silane to be added into the mixture is calculated by using the commonly known formula:

silane (gr.)=nanoparticles (gr.)×surface area (m2/gr)/kSWA where k=Specific Wetting Area of the used silane By adding the silane compound, silane-functionalized nanoclusters of inorganic nanoparticles, which do not further aggregate, are obtained. In other words, the silane "freezes" the cluster of nanoparticles in the size it was in at the time of its addition.

Furthermore the silane allows the compatibilization of the inorganic core of the scattering element, with the matrix wherein the silane-coated nanoparticles will be dispersed.

Phase 4—Filtration and Concentration

The dispersion obtained as discussed above, is filtered through a suitable system with, in this example, a cutoff at 150 nm. This physically removes aggregates and nanoparticles having a non-adequate size in a fast, precise and relatively inexpensive.

It shall be noted that after centrifuging the dispersion, removing the solvent, and leaving for 2 months the scattering elements to "dry", once they are wetted again by addition of solvent to the dry scattering elements, by simple mechanical stirring, the scattering elements return to their original conditions of dispersion, i.e. without showing an increase in diameter of the scattering elements. This has been verified by measuring the size of the scattering elements by means of Dynamic Light Scattering machine.

Phase 5—Preparation of the PMNC

The dispersion, containing the scattering elements, was weighed and diluted in a commercial solvent borne paint. The transparent dispersion was sonicated for 2 hours to get the scattering elements well dispersed. Spray coating, a standard application technique, is then used to coat a selected substrate material according to the final application. Depending on the thickness of the paint and the concentration of scattering elements used, various gradation of Rayleigh Scattering can be obtained.

Other techniques may be used, such as extrusion, injection moulding, reaction injection moulding, bulk polymerization compression moulding, transfer moulding, extrusion moulding, rotomoulding, blow moulding, calendering, knife coating, etc.

The characteristic of having a starting material that can undergo many different treatments is one of the advantages of the present invention.

The invention claimed is:

1. A composite system comprising a matrix in which a plurality of scattering elements is dispersed, wherein said matrix is of a material that per se is transparent, said scattering elements have a core, said core having a refractive index that is different from the refractive index of the matrix to provide a scattering of at least a portion of the light transmitted through said system, wherein:

said core comprises a nanocluster of nanoparticles made of inorganic material, said nanocluster having average dimensions in the range of 20 nm to 300 nm, and said scattering elements further comprise at least a silane compound and at least a dispersing agent that provide at least part of a shell for said core.

2. A composite system according to claim 1, wherein said matrix is a polymer matrix.

3. A composite system according to claim 2, wherein said scattering elements are free from a shell made of the same polymer of the polymer matrix.

4. A composite system according to claim 2, wherein said matrix is a paint.

5. A composite system according to claim 2, wherein said polymer matrix is an adhesive material or a film configured for glass lamination.

6. A composite system according to claim 5, wherein said polymer matrix is selected from ethylene vinyl acetate (EVA), polyvinyl butyral (PVB), and mixtures thereof.

7. A process of glass lamination, wherein a composite system according to claim 2 is used as adhesive material for coupling layers of glass.

8. A composite system according to claim 2, wherein said matrix is an anti-scratch paint.

9. A composite system according to claim 1, wherein said inorganic material is selected from $TiO_2$, $SiO_2$, ZnO, $ZrO_2$, $Fe_2O_3$, $Al_2O_3$, $Sb_2SnO_5$, $Bi_2O_3$, $CeO_2$.

10. A composite system according to claim 1, wherein said nanocluster has an average dimension in the range of 50 nm to 200 nm.

11. A composite system according to claim 10, comprising scattering elements having a core comprising a single nanoparticle and having a shell including at least one silane compound and at least one dispersing agent that provide at least part of a shell for said single nanoparticle core.

12. A composite system according to claim 1, wherein said at least one silane compound is selected from Triacetoxy(methyl)silane, Di-Tert-butoxydiacet-oxysilane, Phenyltriethoxysilane, (3-Aminopropyl)tris(trimethylsiloxy)silane, N-(n-butyl)-3-amino-propyltrimehoxysilane, N-[3-(Trimethoxysilyl)propyl]aniline, Bis(3-triethoxysilylpropyl) amine, γ-Aminopropyltriethoxysilane, 2-(Allyldimethylsilyl)pyridine, 3-(Trimethoxysilyl) propyl-methacrylate, Vinyltrimethoxysilane, Triphenyl(vinyl)silane, Tris(2-methoxyethoxy)(vinyl)silane, γ-Glycidoxypropyltrimethoxysilane, 3-(Triethoxysilyl)propyl isocyanate, or a mixture thereof.

13. A composite system according to claim 1, wherein the number of scattering elements within a volume element delimited by a portion of a panel, foil or film surface having an area of 1 $m^2$, is N, wherein N≥$N_{min}$ and wherein:

$$N_{min} = \upsilon \frac{10^{-29}}{D^6} \cdot \left|\frac{m^2+2}{m^2-1}\right|^2$$

where υ is a dimensional constant equal to 1 meter[6], $N_{min}$ is expressed as a number/meter$_2$, the effective diameter D, which is given by the scattering element diameter times the matrix refractive index, is expressed in meters and wherein m is equal to the ratio of the refractive index of the nanoparticle core to the refractive index of the matrix material.

14. A composite system according to claim 13, wherein 2$N_{min}$≤N≤13$N_{min}$.

15. A composite system according to claim 13, wherein N is in the range $3N_{min}$ to $10N_{min}$.

16. A composite system according to claim 13, wherein $N \approx 6N_{min}$.

17. A composite system according to claim 1, wherein said nanocluster has an average dimension in the range of 80 nm to 130 nm.

18. A composite system according to claim 1, wherein the nanocluster is an aggregate of the nanoparticles.

19. A composite system according to claim 1, wherein single nanoparticles are also dispersed in the matrix.

20. A composite system according to claim 1, wherein said matrix material does not absorb light.

21. A system comprising a matrix that is a paint configured as a layer on a reflecting element or a mirroring surface, wherein:
- a plurality of scattering elements is dispersed in the paint,
- the paint is of a material that per se is transparent,
- each scattering element has a core that has a refractive index that is different from the refractive index of the matrix to provide a scattering of at least a portion of the light transmitted through the system,
- each core comprises a nanocluster of nanoparticles made of inorganic material, the nanocluster having average dimensions in the range of 20 nm to 300 nm, and
- the scattering elements further comprise at least a silane compound and at least a dispersing agent that provide at least part of a shell for said nanocluster core.

22. A process for preparing a composite system that is a matrix/nanocluster composite system, wherein a plurality of scattering elements is dispersed in a matrix, wherein the material used for preparing matrix is a material that per se is transparent, the method comprising:
- a. selecting at least one inorganic material made of nanoparticles, said nanoparticles having average dimensions in the range of 10-150 nanometers;
- b. mixing said material, at least one solvent and at least one dispersing agent, to obtain a dispersion of nanoclusters having average dimensions in the range of 20 to 300 nanometers;
- c. adding at least one silane compound to the dispersion obtained in step b) to give a dispersion of scattering elements having an inorganic core that is a nanocluster as per point b) and at least part of a silane shell;
- d. dispersing said dispersed scattering elements into the systems from which said matrix will be obtained;
- whereby said matrix/nanocluster composite system provides a scattering of at least a portion of the light transmitted through said composite system or through a product containing said system.

23. A process according to claim 22, wherein said matrix/nanocluster composite system provides a Rayleigh or a Rayleigh-type scattering of at least a portion of the light transmitted through said system or through a product containing said system.

24. A process according to claim 23, wherein step b) provides a dispersion including nanoclusters and single nanoparticles, said nanoclusters and nanoparticles having average dimensions in the range of 20 to 300 nanometers.

25. A process according to claim 22, wherein said matrix is a paint comprising polymer resins and at least a solvent, and wherein said scattering is provided by said polymer matrix/nanocluster composite system after said solvent has evaporated from a layer of paint.

26. A process according to claim 22, further comprising acidifying the mixture during step b).

27. A process according to claim 22, wherein said matrix is an adhesive material configured for glass lamination.

28. A process according to claim 22, wherein said matrix is an adhesive material selected from ethylene vinyl acetate (EVA), polyvinyl butyral (PVB), and mixtures thereof.

29. A process according to claim 22, further comprising filtering the dispersion obtained in step c) in order to select the dispersed scattering elements having the desired average dimension.

30. A process according to claim 29, further comprising concentrating the filtered dispersion.

* * * * *